United States Patent [19]
Okamoto

[11] Patent Number: 5,819,894
[45] Date of Patent: Oct. 13, 1998

[54] CABLE WINDING APPARATUS

[75] Inventor: Isao Okamoto, Osaka, Japan

[73] Assignee: Nichido Kogyo Kabushiki Kaisha, Osaka, Japan

[21] Appl. No.: 901,278

[22] Filed: Jul. 29, 1997

[30] Foreign Application Priority Data

Sep. 19, 1996 [JP] Japan ................................ 8-009468 U

[51] Int. Cl.$^6$ .................................................. H02G 11/00
[52] U.S. Cl. ............................................................ 191/12.4
[58] Field of Search ........................... 191/12 R, 12.2 R, 191/12.4, 12.2 A; 174/69; 242/370, 405.2, 388.5, 402, 406, 388, 378, 405, 405.3; 248/51, 329; 267/69; 362/198

[56] References Cited

U.S. PATENT DOCUMENTS

| | | | |
|---|---|---|---|
| 3,290,453 | 12/1966 | Jensen | 191/12.4 |
| 4,095,871 | 6/1978 | Holte | 242/405.2 |
| 4,123,012 | 10/1978 | Hough | 242/405.2 |
| 4,177,961 | 12/1979 | Gruenewald | 242/405.2 |
| 4,656,320 | 4/1987 | Maddock | 191/12.4 |
| 4,725,697 | 2/1988 | Kovacik et al. | 191/12.4 |
| 4,778,125 | 10/1988 | Hu | 191/12.2 R |

FOREIGN PATENT DOCUMENTS 3916400  9/1990  Germany ............................. 191/12.4

*Primary Examiner*—Mark Tuan Le
*Attorney, Agent, or Firm*—McDermott, Will & Emery

[57] ABSTRACT

A cable winding apparatus includes a first member having an outlet attached thereto, a second member extending approximately in parallel with the first member, and a connecting portion connecting the first and second members. A handle portion is provided at a central portion of the second member. Accordingly, portability of the cable winding apparatus can be improved.

5 Claims, 6 Drawing Sheets

CABLE WINDING APPARATUS

BACKGROUND OF THE INVENTION

1. Field of the Invention

The present invention relates to a cable winding apparatus, and more particularly relates to a cable winding apparatus with a plug outlet or socket which has an improved portability.

2. Description of the Background Art

A cable drum used at, for example, a construction site is widely known widely. FIG. 6 is a perspective view illustrating one example of a conventional cable drum 20.

Referring to FIG. 6, cable drum 20 includes a support leg 21, a pair of side plates 22a, 22b, a winding drum body 26, a plug outlet or socket 23, and a cable 24. Winding drum body 26 is attached such that it can rotate on a shaft (not shown) laterally projecting from one portion of support leg 21. Rotation of winding drum body 26 allows cable 24 to be drawn out or wound up. One end of cable 24 is connected to an outlet 23, and the other end thereof has a plug 25 attached thereto.

When cable drum 20 is used at a construction site, for example, plug 25 is connected to a power supply source and cable drum 20 is carried to a desired location while cable 24 is drawn out from winding drum body 26. At this location, a plug of an electrical equipment is inserted into outlet 23.

Cable drum 20 has a problem as described below.

As shown in FIG. 6, the size of cable drum 20 is relatively large, having support leg 21, side plates 22a, 22b and the like. Therefore, cable drum 20 has poor portability when cable drum 20 is actually carried.

SUMMARY OF THE INVENTION

The present invention is made to solve such a problem as described above. An object of the invention is to provide a cable winding apparatus which has a superior portability.

The cable winding apparatus according to the invention has first and second members and a connecting portion. The first member has an outlet or socket attached thereto. The second member extends approximately in parallel with the first member, and has a handle portion provided at its central portion. The connecting portion has a function of coupling the first and second members together and providing a portion where a cable is wound. One end of the cable is connected to an outlet or socket and the other end thereof has a plug attached thereto. The first and second members may be of plate-like or bar-like construction. The handle portion may be integrated with the second member, or a separate member may be attached to the central portion of the second member as the handle portion.

The cable winding apparatus according to the present invention includes the first and second members extending approximately in parallel with each other, and the handle portion provided at the central portion of the second member. This structure enables the cable winding apparatus to be carried in a stable state by holding the handle portion in hand while the cable is wound on the connecting portion which couples the first and second members together. Further, the structure can be simplified since support leg 21 or the like used for the conventional apparatus can be omitted. As a result, the portability of the cable winding apparatus can be improved.

Preferably, projecting portions which project outward from an outer surface of the connecting portion are respectively provided at both side ends of the first and second members. The projecting portion preferably has a through hole.

The cable can be wound on the connecting portion tightly without unwinding of the cable by providing the projecting portions at both side ends of the first and second members. Further, the projecting portions enable easier winding operation of the cable on the connecting portion. If a hook is attached to the wall, for example, the through hole provided in the projecting portion further enables the cable winding apparatus to be hung on the wall by the engagement of the hook with the through hole. Accordingly, the cable winding apparatus can be used while it is hung on the wall when the apparatus cannot be placed on the ground.

Preferably, the handle portion is formed by making the width of the central portion of the second member smaller than the width of the projecting portion thereof. The width in this case refers to the width measured in a direction perpendicular to the longitudinal direction of the second member. For example, the width of the handle portion and the width of the projecting portion are respectively shown by W2 and W1 in FIG. 3. A surface of the projecting portion preferably has a groove formed therein for fixing a portion of the cable adjacent to the plug to the handle portion. Preferably, a through space which communicates with a space around the handle portion is provided between the handle portion and the first member.

By forming the handle portion such that the width of the central portion of the second member is smaller than the width of the projecting portion thereof, and providing the through space between the handle portion and the first member as described above, the handle portion can be easily gripped with the hand. As a result, the portability of the cable winding apparatus can be improved. By providing the groove as described above at the surface of the handle portion, a portion of the cable adjacent to the plug or a portion adjacent to the tip of the cable can be fixed to the handle portion. As a result, unwinding of the cable can be effectively prevented.

The connecting portion preferably has spaced first and second connecting members arranged to sandwich the through space described above. Outer surfaces of the first and second connecting members at the side of the projecting portion are preferably constituted by curved surfaces projecting outward.

By providing a space between the first and second connecting members, a longer cable can be wound on the connecting portion. The outer surfaces (corresponding to 5c and 5d in FIG. 2) of the first and second connecting members at the side of the projecting portion constituted by outwardly projecting curved surfaces allow a cable to be wound on the connecting portion conveniently.

Preferably, the outer edge portion of the first member located around the plug outlet rises above the surface of the outlet.

Accordingly, the surface of the outlet does not contact the ground when the cable winding apparatus is placed on the ground with its first member facing downwards. The surface of the outlet can thus be protected.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
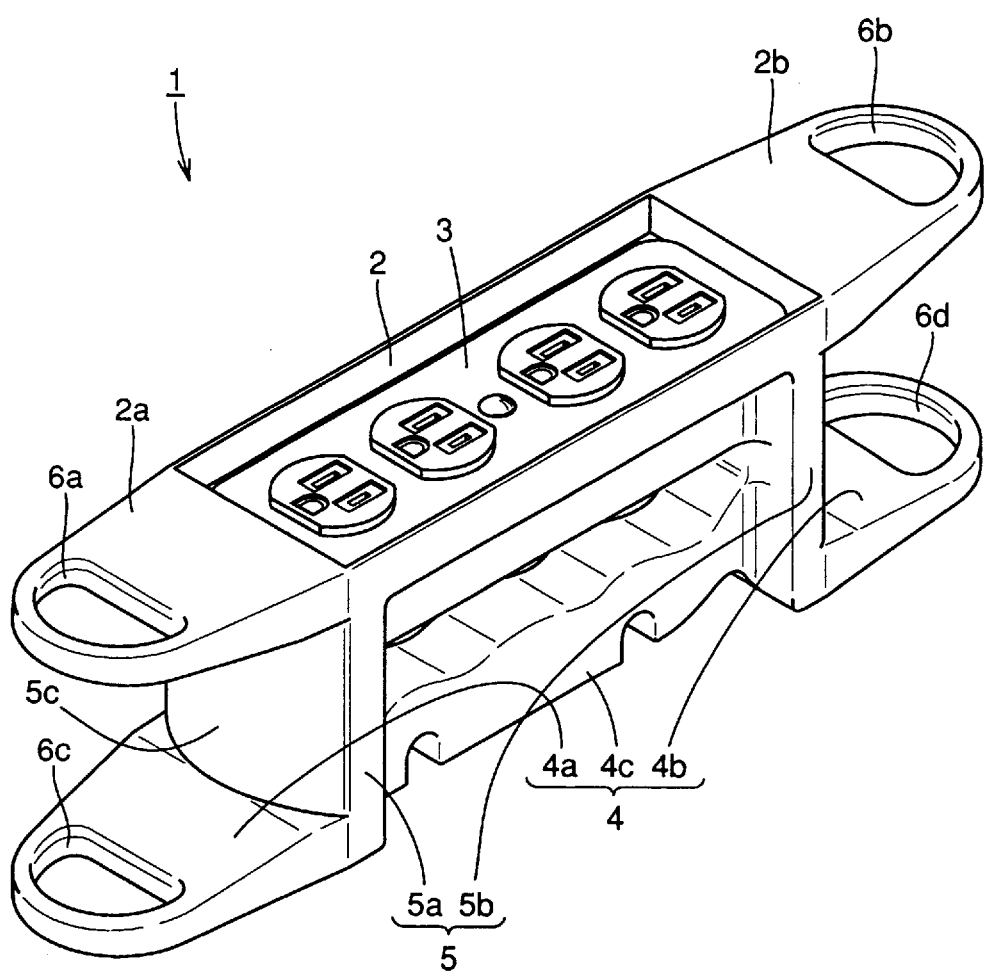
FIG. 1 is a perspective view of a cable winding apparatus according to a first embodiment.

An embodiment of the present invention will be described with reference to FIGS. 1–5. FIG. 1 is a perspective view illustrating a cable winding apparatus 1 according to a first embodiment of the invention.

Referring to FIG. 1, cable winding apparatus 1 is provided with a first member 2, a second member 4, and a connecting portion 5. The first member 2 is constituted by a sheet-like member formed of, for example, plastic. An outlet or socket strip 3 is attached to the central portion of the first member 2. The outer edge portion of the first member 2 preferably rises above the surface of the outlet strip 3. Accordingly, the surface of the outlet strip 3 can be protected when the cable winding apparatus 1 is placed on the ground with the first member 2 facing downwards.

Connecting portion 5 is formed of, for example, plastic and includes first and second connecting members 5a and 5b extending in a direction approximately perpendicular to the direction of the first member 2. A cable is wound around the first and second connecting members 5a and 5b.

The second member 4 is formed of, for example, plastic and extends approximately in parallel with the first member 2. At the central portion of the second member 4 a handle portion 4c is provided. Handle portion 4c at the central portion of the second member 4 enables cable winding apparatus 1 having a cable wound on connecting portion 5 to be carried by hand in a stable state.

Figure 4:
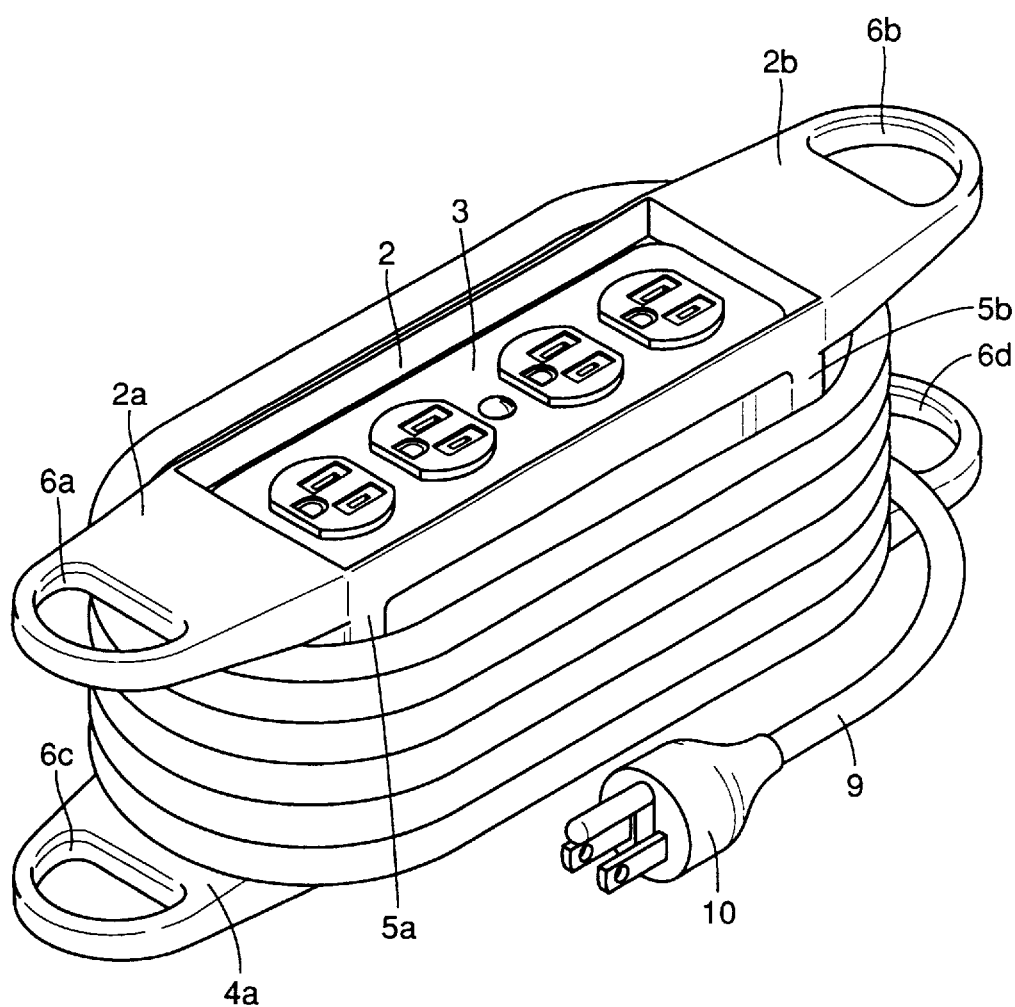
FIG. 4 is a perspective view of the cable winding apparatus shown in FIG. 1 having a cable wound therearound.

A pair of projecting portions 2a and 2b are provided at both side ends of the first member 2 such that the projecting portions project outward from the outer surfaces of the first and second connecting members 5a and 5b. Similarly, a pair of projecting portions 4a and 4b are provided at both side ends of the second member 4. By providing projecting portions 2a, 2b, 4a, and 4b, unwinding of a cable 9 can be effectively prevented when cable 9 is wound on the first and second connecting members 5a and 5b as shown in FIG. 4. By adjusting the length of projecting portions 2a, 2b, 4a, and 4b appropriately, cable 9 can be wound into multiple layers. Further, projecting portions 2a, 2b, 4a, and 4b enables easier winding operation of cable 9.

As shown in FIG. 1, projecting portions 2a, 2b, 4a, and 4b respectively have through holes 6a, 6b, 6c, and 6d. By providing through holes 6a–6d, engagement of through holes 6a–6d with engagement means such as a hook attached on the wall is possible. Accordingly, cable winding apparatus 1 can be used or kept while hung on the wall. Even if cable winding apparatus 1 cannot be used while placed on the ground, cable winding apparatus 1 is usable by hanging it on the wall or the like.

Figure 2:
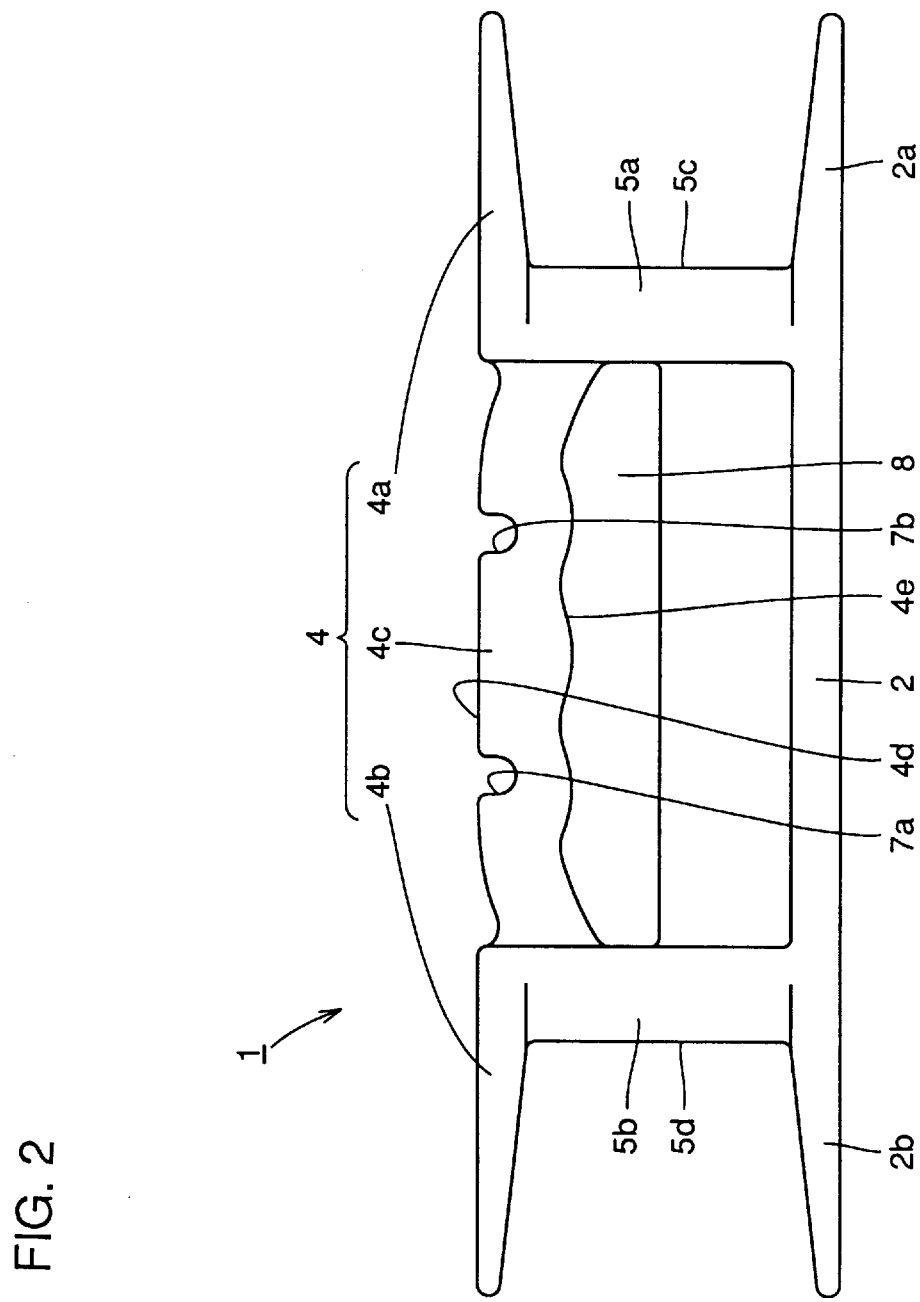
FIG. 2 is a side view of the cable winding apparatus shown in FIG. 1.
Figure 3:
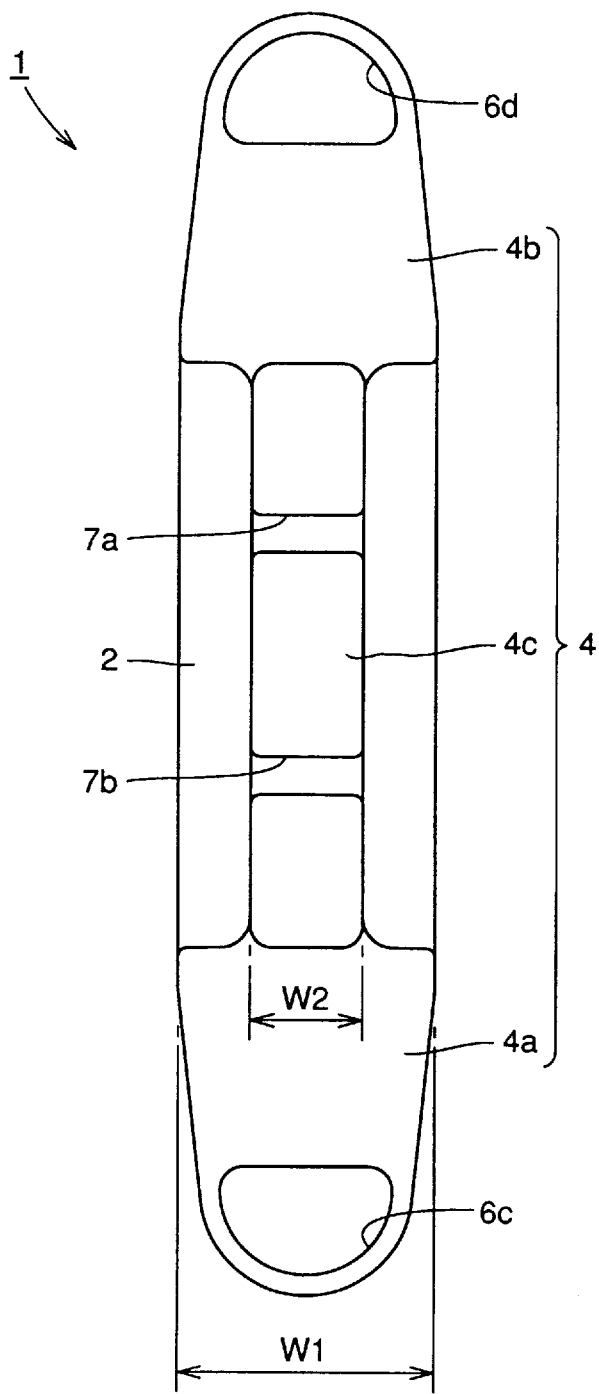
FIG. 3 is a rear elevation of the cable winding apparatus shown in FIG. 1.
Figure 5:
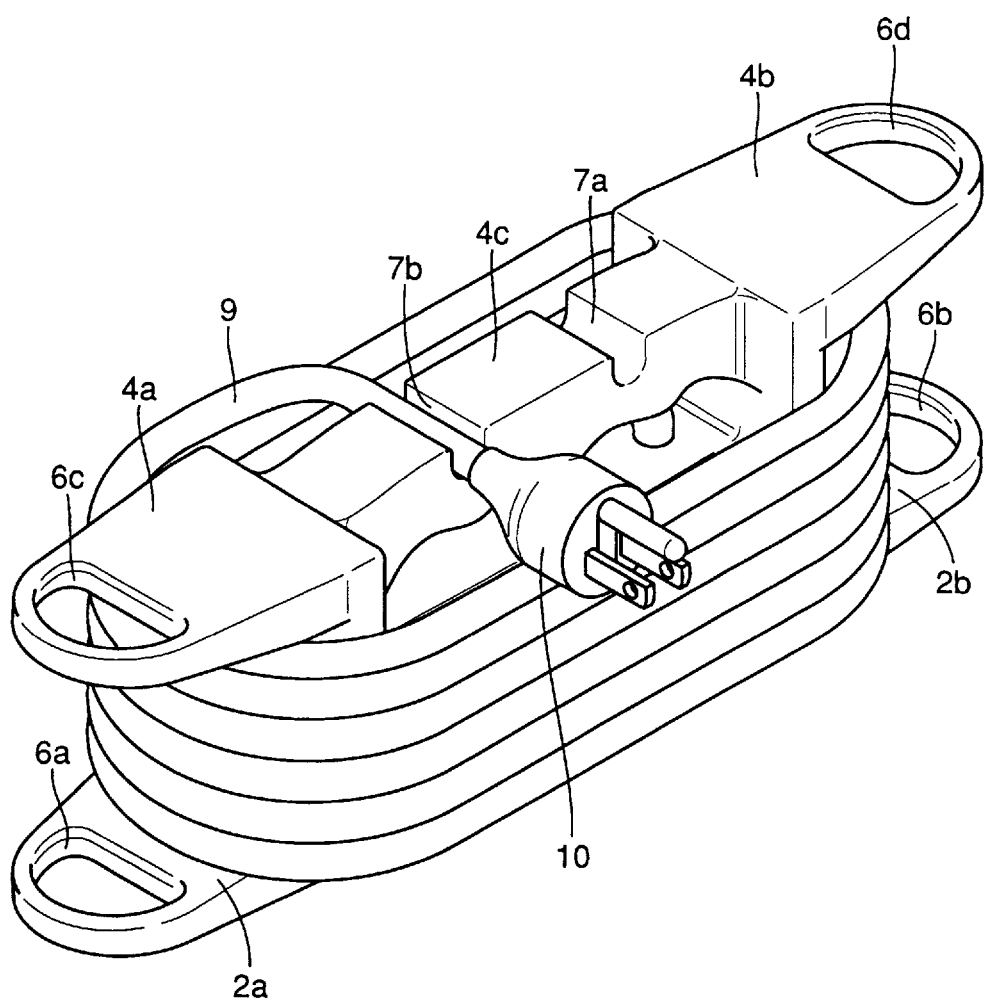
FIG. 5 is a perspective view of the cable winding apparatus shown in FIG. 1 when the tip portion of the cable is fixed to the handle portion of the cable winding apparatus.
Figure 6:
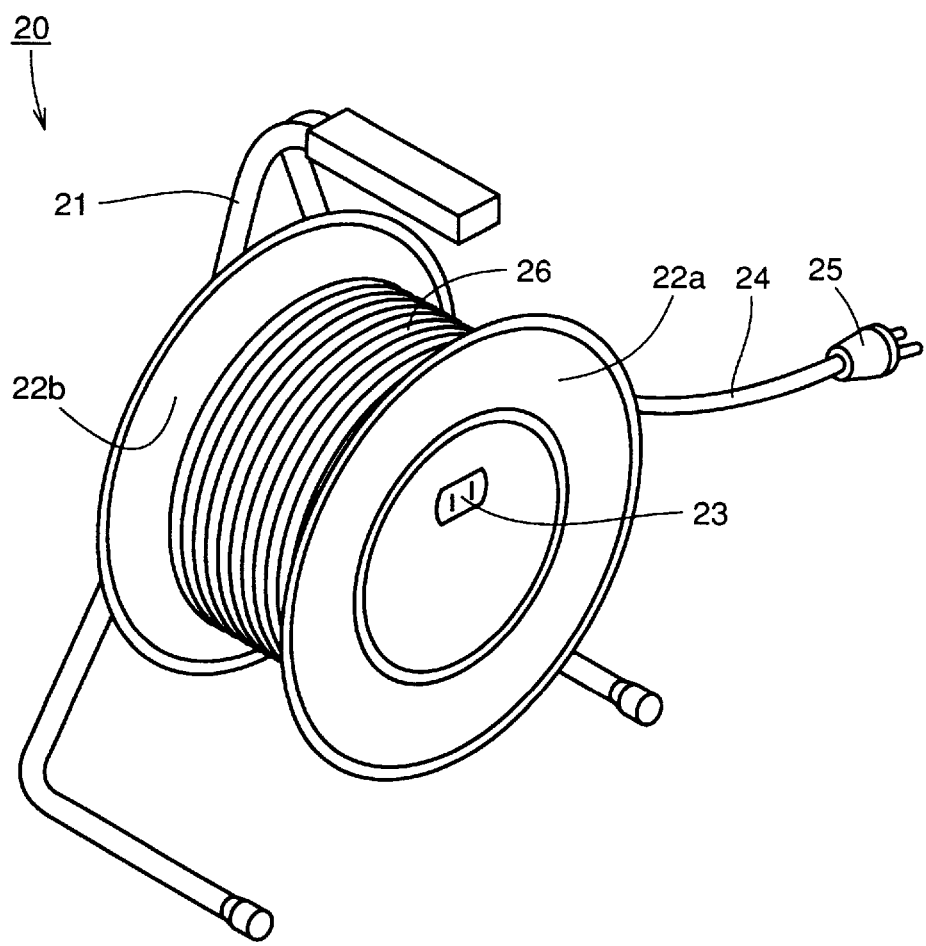
FIG. 6 is a perspective view of a conventional cable drum.

Referring to FIGS. 2, 3, and 5, details of the structure of cable winding apparatus 1 according to the invention will be given. FIG. 2 is a side view of cable winding apparatus 1 according to the present invention. FIG. 3 shows the rear of cable winding apparatus 1.

With reference to FIGS. 2 and 3, groove portions 7a and 7b which are approximately in parallel with each other are formed at a surface 4d of handle portion 4c. Although groove portions 7a and 7b are provided to extend in a direction perpendicular to the longitudinal direction of the second member 4 as shown in FIG. 3, they may extend in another direction. The number of groove portions 7a and 7b may be one or more than two.

One end portion of cable 9 adjacent to a plug 10 or a portion adjacent to a tip of cable 9 is pushed into one of groove portions 7a and 7b as shown in FIG. 5. Accordingly, the portion adjacent to the tip of cable 9 can be fixed to handle portion 4c. Unwinding of cable 9 can thus be effectively prevented.

As shown in FIG. 3, the width W2 of handle portion 4c is adjusted to be smaller than the width W1 of projecting portions 4a and 4b of the second member 4. Between handle portion 4c and the first member 2, a through space 8 communicating with the space around handle portion 4c is provided as shown in FIG. 2. The handle portion 4c can be gripped easily by decreasing the width W2 of handle portion 4c, and by providing through space 8 directly under handle portion 4c. Further, by shaping the back surface 4e of handle portion 4c into a wave-like form as shown in FIG. 2, handle portion 4c can be easily gripped with the hand.

Preferably, first and second connecting members 5a and 5b are arranged to sandwich through space 8 and handle portion 4c. By widening the interval between first and second connecting members 5a and 5b, a long cable 9 can be wound on cable winding apparatus 1.

Preferably, an outer surface 5c of the first connecting member 5a located at a side of projecting portions 4a and 2a as well as an outer surface 5d of the second connecting member 5b located at a side of projecting portions 4b and 2b are both constituted by outwardly projecting curved surfaces. Outer surfaces 5c and 5d are preferably constituted by a part of a surface of revolution. Specifically, outer surfaces 5c and 5d are constituted by a part of an outer surface of a cylinder. Accordingly, cable 9 can be wound on the first and second connecting members 5a and 5b conveniently, and unwinding of the cable 9 can be effectively prevented.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A cable winding apparatus, comprising:
   a first elongated plate-like member having at least one electrical outlet attached thereto;
   a second elongated plate-like member extending substantially parallel to and spaced from said first elongated member;
   first and second spaced apart connecting members connecting said first and second elongated members in said substantially parallel, spaced apart manner, said first and second connecting members providing portions adapted for winding therearound a cable;
   wherein said second elongated member comprises first, second, and third portions, the second portion being located intermediate the first and second connecting members and forming a handle portion having a width smaller than that of the first and third portions and adapted for gripping by a hand; and said first and third portions including projecting portions which extend over the first and second connecting members, respectively.

2. The cable winding apparatus according to claim 1, wherein projecting portions extending beyond the first and second connecting members are also provided at both ends of said first elongated member, and a through hole is provided in at least one of said projecting portions.

3. The cable winding apparatus according to claim 2, wherein a groove for fixing a portion of said cable adjacent to said handle portion is formed at a surface of said handle portion, and a through space communicating with a space around said handle portion is provided between said handle portion and said first elongated member.

4. The cable winding apparatus according to claim 3, wherein said first and second connecting members are arranged to sandwich said through space, and outer surface portions of said first and second connecting members facing said projecting portions are constituted by outwardly projecting curved surfaces.

5. The cable winding apparatus according to claim 1, wherein an outer edge portion of said first elongated member located around said at least one electrical outlet rises above a surface of said at least one electrical outlet.

* * * * *